3,220,793
COLORATION PROCESS
Brian Neville Parsons and Eric Dronfield, Manchester, England, assignors to Imperial Chemical Industries Limited, London, England, a corporation of Great Britain
No Drawing. Filed July 25, 1963, Ser. No. 297,689
2 Claims. (Cl. 8—14)

This invention relates to a new process for the coloration of textile materials. More particularly the invention provides a new and improved method for the coloration of cellulose textile fabrics with "reactive" dyes to give white and/or colored effects in conjunction with ground shades which can be, for example, produced by padding, cover-printing, or over-printing.

By a reactive dyestuff we mean a water-soluble dyestuff which contains a reactive halogen atom or other substituent capable of reacting with the fibre so that the remainder of the dyestuff becomes attached to the fiber through a covalent bond. As examples of such dyestuffs, there may be mentioned, for example, dyestuffs containing s-triazinyl or pyrimidyl radicals carrying labile atoms or groups directly attached to the ring, and dyestuffs containing a beta-halogenopropionyl, beta-halogenoethyl sulphonyl, beta-halogenoethylsulphamyl, beta-sulphatoethylsulphonyl, beta - hydroxyethylsulphonyl, chloro - acetylamino, beta - (chloromethyl) - beta - sulphatoethylsulphamyl, acryloylamino, beta-(alkyl and arylsulphonyloxy)alkylsulphonyl, beta - acyloxyalkylsulphonyl, vinylsulphonyl, alkyl phosphite or sulphon fluoride radical.

By a labile atom or group, we mean an atom or group which is bound by a covalent bond to a carbon atom of the pyrimidine or triazine nucleus but which readily dissociates under the influence of heat or alkalis, especially in the presence of moisture, to form an ion or an uncharged molecule. As examples of such atoms or groups, there may be mentioned, for example, bromine or, preferably, chlorine atoms, sulphonic acid groups, thiocyano groups, negatively substituted aryloxy and arylthio groups such as sulphophenoxy, sulphophenylthio, nitrosulphophenoxy, disulphophenoxy and sulphonaphthoxy groups, quaternary ammonium groups, groups of the formula:

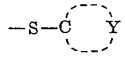

wherein Y represents the group of atoms necessary to form a 5- or 6-membered heterocyclic ring which may carry substituents or form part of a fused ring system; groups of the formula:

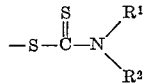

wherein $R^1$ and $R^2$ each represents the same or different alkyl, cycloalkyl, aryl or aralkyl groups, or $R^1$ and $R^2$ together form, together with the nitrogen atom, a 5- or 6-membered heterocyclic ring; and groups of the formula:

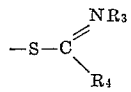

wherein $R_3$ and $R_4$ may be the same or different and each represents a hydrogen atom or an alkyl, aryl or aralkyl group.

The dyestuffs in these classes may be for example nitro dyestuffs or dyestuffs of the azo, anthraquinone or phthalocyanine series, and may be metal free or may contain metal in complex formation. Specific examples of suitable dyestuffs are described in United Kingdom specification No. 209,723 in Examples 1 and 2, United Kingdom specification No. 298,494 in Example 1, in United Kingdom specifications Nos. 460,224, 733,471, 740,533, 775,308, 772,030, 774,925, 780,591, 781,930, 785,120, 785,222, 802,198, 805,562, 826,689 and 852,604, and in copending United Kingdom application No. 34,480/59.

It is well known that the commercially-available reactive dyes vary widely in their rate of reaction with the fibre, so that whereas, for example, a dyestuff containing a dichlorotriazine radical can be easily reacted with the cellulose molecule in the cold, a dyestuff containing a chloropyrimidine, or a chloroaminotriazine, or a sulphatoethylsulphonamide group requires heating or a very prolonged period of reaction in the cold, to obtain a commercially-acceptable standard of dyeing. We have now found that this difference in reactivity can be exploited to give valuable multicolor effects by applying a multiplicity of reactive dyes having different reactivities, or a colorless compound of high reactivity and a dyestuff of lower reactivity, in an overlapping manner and restricting the amount of acid-binding agent in the overlapping areas so that only the more reactive dye (or colorless compound) fixes on the fibre in that portion.

This process can conveniently be carried out, for example by applying one printing paste containing the more reactive dye to the textile material and subsequently, if desired after drying the textile material, cover-printing or over-printing the printed area with a second printing paste, or nip-padding the textile material in a padding liquor, which contains the acid-binding agent and a reactive dyestuff of lower reactivity, then drying and steaming the so-treated textile material.

The process can also be carried out by nip-padding or slop-padding the textile material in a padding liquor containing the dyestuff of lower reactivity and acid-binding agent, drying the textile material and overprinting with the paste containing the more reactive dyestuff and then drying and steaming.

The time of steaming can be that usually adopted for the fixation of the lesser reactive dyestuff and under normal circumstances a period of from 5 minutes upwards will suffice. If desired, the fabric can be subjected to the action of heat in a different manner to fix the dyestuff, for example by baking at a temperature of from 90° C. to 160° C. for a period of 60 minutes to 1 minute. The fixation can also be achieved by subjecting the printed material to infra-red radiation.

To obtain a commercially-acceptable result, the difference in reactivity between the dyestuffs must be fairly substantial. As a convenient guide, it can be taken that the reactivities of the two dyestuffs as measured by their rate of hydrolysis in water, should be of the order of 15 to 1 or greater. In general, dyestuffs containing a dichlorotriazine, a quaternized chlorotriazine, a β-chloroethylsulphenyl or a sulphatoethyl sulphonyl group can be used as dyestuffs having a high reactivity, whilst those containing a chloroaminotriazine, a di- or tri-chloropyrimidine or a sulphatoethylsulphanamide group can be used as dyestuffs having a low reactivity.

The printing pastes and padding solutions can contain the usual adjuvants used in the art of applying reactive dyestuffs, for example, urea, wetting agents such as alkali metal alkylated naphthalene sulphonates and condensates of ethylene oxide with alkylated phenols, fatty alcohols or fatty amines, migration inhibitors such as sodium chloride or sodium sulphate, mild oxidizing agents such as sodium m-nitrobenzene sulphonate and thickeners such as sodium alginate (which can also act as a migration inhibitor) and oil-in-water or water-in-oil emulsions. Suitable methods for application of the reactive dyestuffs are, for example, described and claimed in United Kingdom specifications Nos. 797,946, 798,121, 816,925, 819,-320, 820,470, 822,047, 823,098 and 838,336.

To obtain a white effect, in place of the more reactive dyestuff, there is used a colorless reactive compound of high reactivity, for example water-soluble primary condensation products of cyanuric chloride and amines, such as (2,4-dichloro-s-triazin-6-ylamino)naphthalene-sulphonic acids.

It is to be understood that the printing paste containing the more reactive dyestuff, or the colorless reactive compound, should not contain the usual acid-binding agent. In some cases, and particularly where medium or pale depths of shade of the more reactive dyestuff are employed, an improved effect can be obtained by adding a colorless reactive compound of high reactivity, to the printing paste containing the more reactive dyestuff. Alternatively similar improved effects may be obtained by adding a neutral substance which forms an acid on steaming, to the printing paste containing the more reactive dyestuff. As examples of such substances, there can be mentioned for example diethyl tartrate, dimethyloxalate, urea oxalate and ammonium dihydrogen phosphate. Under certain conditions it may be desirable to add both the colorless reactive compound, and the acid forming agent to the printing paste containing the more reactive dyestuff.

The new process has the advantage of being very simple to operate and offers the possibility of a very wide range of colors and special effects similar to resist or discharge styles, having exceptionally clear marks, and also having the excellent fastness to washing, rubbing and light, characteristic of reactive dyestuffs.

Compared with the process in which the resist effect is obtained by the use of a resin, acid-forming catalyst and reactive dye and then baking, this new process has the advantage of producing no tendering of the printed area.

The invention is illustrated but not limited by the following examples in which parts and percentages are by weight:

*Example 1*

A mercerized cotton fabric is padded through an aqueous solution containing 10% of urea, 1% of sodium m-nitrobenzene sulphonate, 1% of sodium bicarbonate and 4% of the dyestuff of the formula:

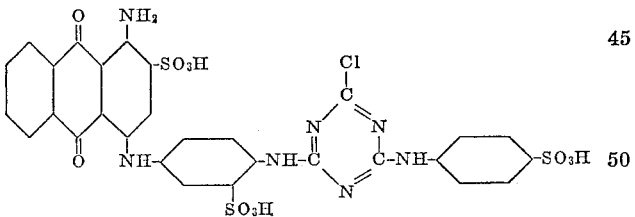

The fabric is then overprinted with a printing paste containing 10% of urea, 1.4% of sodium alginate, 1% of sodium m-nitrobenzene sulphonate and 5% of sodium 1-(2',4'-dichloro-s-triazin-6'-ylamino)naphthalene-5-sulphonate, then dried at 60° C. steamed for 5 minutes, rinsed in cold water, scoured at the boil for 10 minutes, rinsed in cold water and dried.

An excellent white printed effect on a blue ground is obtained.

If the sodium 1-(2',4'-dichloro-s-triazin-6'-ylamino)naphthalene-5-sulphonate used in the above example is replaced by an equal amount of the dyestuff of the formula:

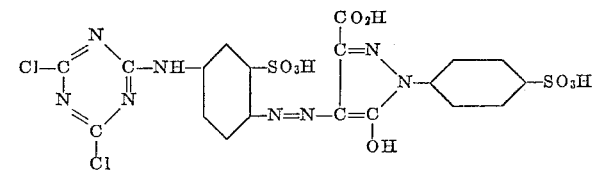

an excellent yellow printed effect on a blue ground is obtained.

If the sodium 1-(2',4'-dichloro-s-triazin-6'-ylamino)naphthalene-5-sulphonate used in the above example is replaced by an equal amount of the dyestuff of the formula:

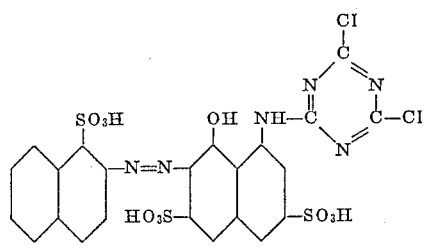

an excellent red printed effect on a blue ground is obtained.

*Example 2*

A white mercerized cotton fabric is printed with a print paste containing 10% of urea, 1.4% of sodium alginate, 1% of sodium m-nitrobenzene sulphonate and 4% of sodium 1-(2',4'-dichloro-s-triazin-6'-ylamino)naphthalene-5-sulphonate, and dried. It is then nip-padded through an aqueous solution containing 10% of urea, 0.4% of sodium alginate, 1% of sodium m-nitrobenzene sulphonate, 1 part of sodium bicarbonate and 4% of the blue dyestuff used in Example 1.

An excellent white printed effect on a blue ground is obtained.

If the sodium 1-(2',4'-dichloro-s-triazin-2'-ylamino)naphthalene sulphonate used in the above example is replaced by an equal amount of the yellow or the red dyestuff used in Example 1, an excellent yellow or red printed effect on a blue ground is obtained.

*Example 3*

A white mercerized cotton fabric is printed with a printing paste containing 10% of urea, 3% of diethyl tartrate, 1% of sodium m-nitrobenzene sulphonate, 1.4% of sodium alginate and 4% of the dyestuff of the formula:

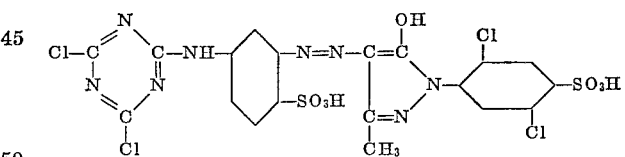

The fabric is dried and then nip-padded through an aqueous solution containing 5% of urea, 1% of sodium m-nitrobenzene sulphonate, 0.4% of sodium alginate, 3% of sodium bicarbonate, 4.2% of the 1:2-chromium complex of the compound of the formula:

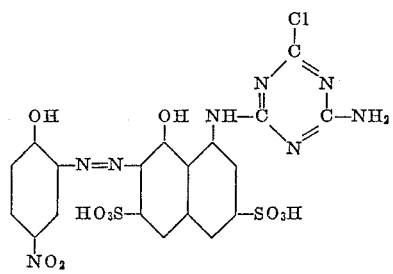

and 1.8% of the 1:2-cobalt complex of this compound.

The fabric is then dried, steamed for 10 minutes, rinsed in cold water, scoured at the boil for 10 minutes, rinsed again in cold water and dried.

An excellent bright yellow printed effect on a black ground is obtained.

If the yellow dyestuff used in the above example is replaced by an equal weight of the dyestuff of the formula:

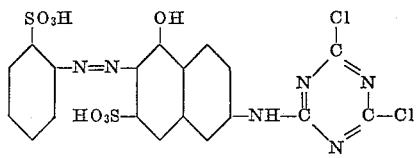

an excellent bright orange printed effect on a black ground is obtained.

Example 4

A white mercerized cotton fabric is printed with a printing paste containing 10% of urea, 1% of sodium m-nitrobenzene sulphonate, 1.4% of sodium alginate, 3% of dimethyl oxalate and 3% of the dyestuff of the formula:

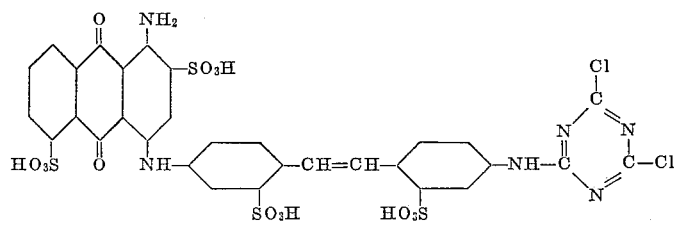

and is then dried.

The fabric is then nip-padded through an aqueous solution containing 10% of urea, 1% of sodium m-nitrobenzene sulphonate, 0.4% of sodium alginate, 1.5% of sodium bicarbonate and 3% of the dyestuff of the formula:

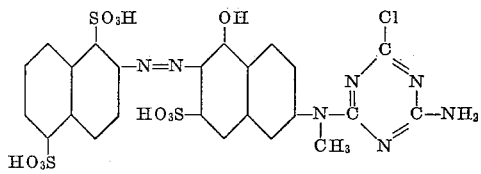

The fabric is then dried, steamed for 5 minutes, rinsed in cold water, scoured at the boil for 10 minutes, rinsed again in cold water and dried. An excellent green printed effect on a bright orange ground is obtained.

Example 5

A white, mercerized cotton fabric is printed with a paste containing 10% of urea, 1% of sodium m-nitrobenzene sulphonate, 1.4% of sodium alginate, 3% of the sodium salt of 2,4-dichloro-6-(5'-sulphonaphth-1'-ylamino)-s-triazine and 2% of the dyestuff obtained as described in Example 3 of Belgian Patent No. 593,939 and is then dried.

The fabric is then nip-padded through an aqueous solution containing 10% of urea, 1% of sodium m-nitrobenzene sulphonate, 0.4% of sodium alginate, 1.5% of sodium bicarbonate and 3% of the dyestuff of the formula:

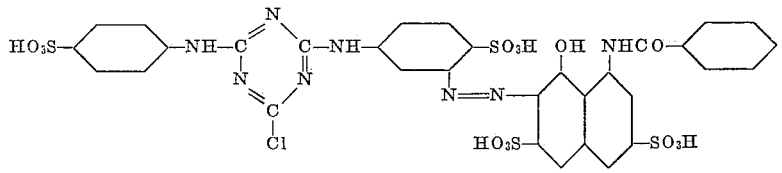

The fabric is then dried, steamed for 10 minutes, rinsed in cold water, scoured at the boil for 10 minutes, rinsed again in cold water and dried. An excellent bright turquoise printed effect on a bluish-red ground is obtained.

Example 6

A white mercerized cotton fabric is printed with a paste containing 10% of urea, 1% of sodium m-nitrobenzenesulphonate, 1.4% of sodium alginate and 3% of the orange dyestuff used in Example 3 and then dried.

The fabric is then overprinted immediately, without drying, with a print paste containing 15% of urea, 1% of sodium m-nitrobenzene sulphonate, 1% of sodium alginate, 30% of an emulsion thickening, obtained as described below, 1.5% of sodium bicarbonate, 2.5% of the dyestuff of the formula:

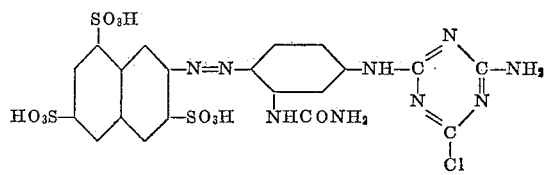

and 2.5% of the dyestuff of the formula:

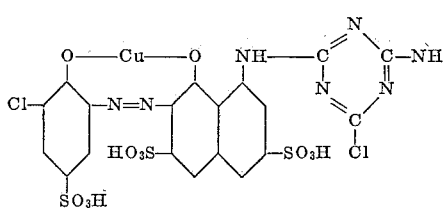

The fabric is then dried, steamed for 8 minutes, rinsed in cold water, scoured at the boil for 10 minutes, rinsed again in cold water and dried. An excellent bright orange printed effect on a dark brown ground is obtained.

The emulsion thickening used in the above example can be obtained by dissolving one part of the condensation product of cetyl alcohol with 29 moles of ethylene oxide in 19 parts of water at 60° C. and stirring rapidly the solution with 80 parts of white spirit.

Example 7

A white mercerized cotton fabric is printed with a paste containing 10% of urea, 1% of sodium m-nitrobenzene sulphonate, 1.4% of sodium alginate, 4% of sodium 1-(2',4' - dichloro - s-triazin-6'-ylamino)naphthalene-5-sulphonate and 1% of the red dyestuff used in Example 1 and is then dried.

The fabric is then nip-padded through an aqueous solution containing 10% of urea, 1% of sodium m-nitrobenzenesulphonate, 0.4% of sodium alginate, 1.0% of sodium bicarbonate and 3% of the dyestuff of the formula:

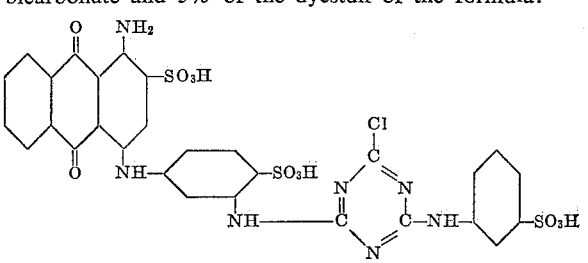

7

The fabric is then dried, steamed for 5 minutes, rinsed in cold water, scoured at the boil for 10 minutes, rinsed again in cold water and dried. An excellent pale bluish-red printed effect is obtained under a blue ground.

*Example 8*

Viscose rayon fabric is printed with an aqueous print paste containing 15% of urea, 1.4% of sodium alginate, 3% of sodium 1 - (2',4' - dichloro-s-triazin-6'-ylamino) naphthalene-5-sulphonate and 3% of the dyestuff of the formula:

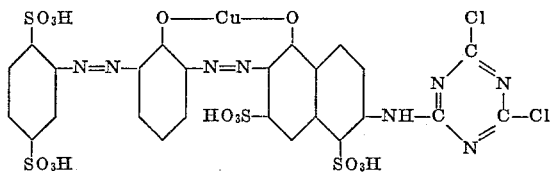

The fabric is dried, then nip-padded in an aqueous solution containing 10% of urea, 0.4% of sodium alginate, 1.5% of sodium bicarbonate and 2% of the dyestuff of the formula:

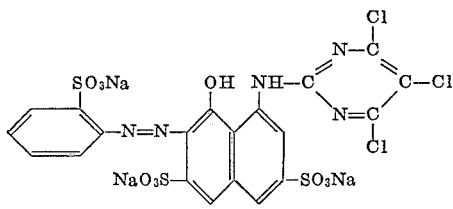

The fabric is dried, steamed for 10 minutes and washed off as in previous examples. A blue printed resist effect on a deep bluish-red ground is obtained.

*Example 9*

In the procedure of Example 8, the dyestuff in the padding solution is replaced by 2% of 2-[4'-(β-sulphatopropionamido)phenylazo] - 8-acetylamino-1-naphthol-3,5-disulphonic acid. An excellent blue printed resist effect on a bright pink ground is obtained.

*Example 10*

In the procedure of Example 5, the dyestuff in the padding solution is replaced by 2% of 2-[4'-(β-sulphatopropionamido)phenylazo] - 8-acetylamino-1-naphthol-3,5-disulphonic acid. An excellent bright turquoise resist print is obtained on a bright pink ground.

*Example 11*

White mercerized cotton is printed with a printing paste containing 3% of sodium 1-(2',4'-dichloro-s-triazin-6'-ylamino)naphthalene-5-sulphonate, 15% of urea, 1.4% of sodium alginate and 3% of the dyestuff of the formula:

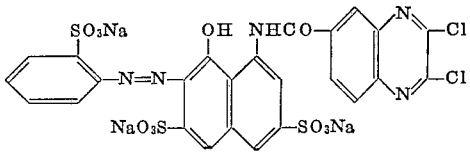

The fabric is dried, then nip-padded in an aqueous solution containing 10% of urea, 0.4% of sodium alginate, 1.5% of sodium bicarbonate and 2% of the dyestuff: 1-(2'-chloro-5'-sulphophenyl) - 3 - methyl-4-(3'-acrylamidophenylazo)-5-pyrazolone.

The fabric is dried, steamed for 10 minutes and washed off as described in the previous examples. An excellent bright red resist print is obtained on a bright yellow ground.

*Example 12*

In the procedure of Example 11, the dystuff in the padding solution is replaced by 2% of the dyestuff of the formula:

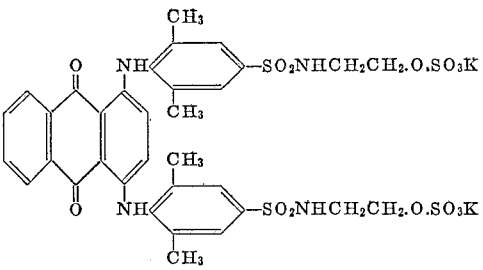

An excellent bright red printed resist effect is obtained on a bright blue ground.

If instead of the above dyestuff, there is used 2% of a mixture of equal parts of the 1:2-chromium and the 1:2-cobalt complexes of the dyestuff of the formula:

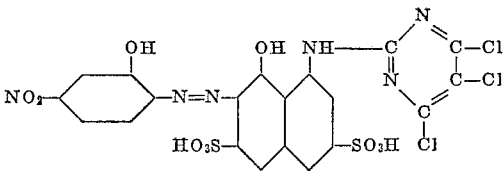

there is obtained a bright red resist effect on a grey ground.

If there is used 2% of the dyestuff of the formula:

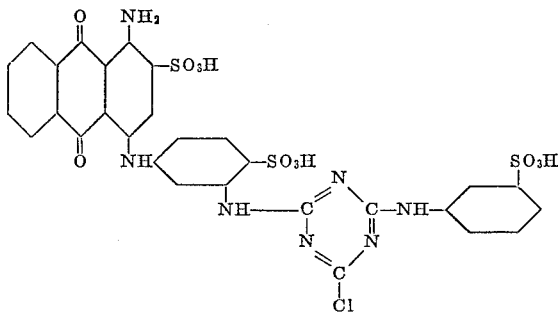

there is obtained a bright red resist effect on a bright blue ground.

We claim:

1. A process for coloring cellulose textile fabrics to give multicolor effects which comprises applying a printing paste having a water-soluble reactive dyestuff dissolved therein to a portion of the fabric, subsequently treating this portion of the fabric together with an additional portion of the fabric, with an aqueous medium containing, in solution, a limited amount of acid-binding agent and a water-soluble reactive dyestuff of substantially lower reactivity than the first applied dyestuff and then subjecting said fabric to the action of an elevated temperature, the amount of acid-binding agent in said aqueous medium being so adjusted that only the more reactive dyestuff fixes on the portion of the fabric to which both dyestuffs are applied.

2. A process for coloring cellulose textile fabrics to give multicolor effects which comprises applying to a portion of the fabric, a printing paste having dissolved therein a water-soluble reactive dyestuff which contains a reactive group selected from the class consisting of dichloro-s-triazine and quaternized chloro-s-triazine groups, subsequently treating the printed portion of the fabric, together with an additional portion of the fabric, with an aqueous medium containing, in solution, a limited amount of acid-binding agent and a water-soluble reactive dyestuff having a reactive group selected from the class consisting of chloroamino-s-triazine, dichloropyrimidine, trichloropyrimidine and sulphatoethylsulphonamide groups, and then subjecting the fabric to the action of an elevated temperature, the amount of acid-binding agent in said aqueous medium being so adjusted that only the first-applied dyestuff fixes on the portion of the fabric to which both dyestuffs are applied.

References Cited by the Examiner

UNITED STATES PATENTS

| | | | |
|---|---|---|---|
| 2,060,186 | 11/1936 | Felix et al. | 8—25 |
| 2,920,932 | 1/1960 | Barnhill | 8—25 X |
| 3,053,604 | 9/1962 | Womble | 8—14 |
| 3,084,016 | 4/1963 | Dawson et al. | 8—1.23 |

NORMAN G. TORCHIN, *Primary Examiner.*